(12) United States Patent
Henderson

(10) Patent No.: US 7,708,291 B1
(45) Date of Patent: May 4, 2010

(54) VEHICLE WITH IMPROVED STEERING SYSTEM

(76) Inventor: Laddie Gene Henderson, 33020 Terrace View Dr., Pacific City, OR (US) 97135

( * ) Notice: Subject to any disclaimer, the term of this patent is extended or adjusted under 35 U.S.C. 154(b) by 0 days.

(21) Appl. No.: 12/322,533

(22) Filed: Feb. 3, 2009

(51) Int. Cl.
*B60G 21/04* (2006.01)
*B62D 9/04* (2006.01)

(52) U.S. Cl. ............... 280/124.103; 280/62; 280/87.1; 280/771; 280/778

(58) Field of Classification Search .......... 280/124.103, 280/62, 771, 778, 87.1
See application file for complete search history.

(56) References Cited

U.S. PATENT DOCUMENTS

| | | | | |
|---|---|---|---|---|
| 3,746,118 | A * | 7/1973 | Altorfer | 180/210 |
| 4,088,199 | A * | 5/1978 | Trautwein | 180/209 |
| 4,740,004 | A * | 4/1988 | McMullen | 280/269 |
| 5,501,478 | A * | 3/1996 | Doan | 280/282 |
| 6,817,617 | B2 * | 11/2004 | Hayashi | 280/5.509 |
| 6,953,203 | B2 * | 10/2005 | Wilcox et al. | 280/282 |
| 7,097,187 | B2 * | 8/2006 | Walters et al. | 280/124.128 |
| 7,487,985 | B1 * | 2/2009 | Mighell | 280/124.103 |
| 7,568,541 | B2 * | 8/2009 | Pfeil et al. | 180/210 |
| 2003/0102176 | A1 * | 6/2003 | Bautista | 180/210 |
| 2004/0051269 | A1 * | 3/2004 | Bouton | 280/124.103 |
| 2005/0012291 | A1 * | 1/2005 | Bagnoli | 280/124.103 |
| 2005/0206101 | A1 * | 9/2005 | Bouton | 280/6.154 |
| 2007/0075517 | A1 * | 4/2007 | Suhre et al. | 280/124.134 |
| 2007/0246903 | A1 * | 10/2007 | Melcher | 280/124.103 |
| 2007/0262548 | A1 * | 11/2007 | Rawlinson | 280/124.103 |
| 2007/0262549 | A1 * | 11/2007 | Haerr et al. | 280/124.103 |
| 2008/0115994 | A1 * | 5/2008 | Martini et al. | 180/210 |
| 2008/0197597 | A1 * | 8/2008 | Moulene et al. | 280/124.103 |
| 2008/0209880 | A1 * | 9/2008 | Derby et al. | 56/10.8 |
| 2008/0258415 | A1 * | 10/2008 | Melcher | 280/124.103 |
| 2008/0258416 | A1 * | 10/2008 | Wilcox | 280/124.103 |

* cited by examiner

*Primary Examiner*—Paul N. Dickson
*Assistant Examiner*—Barry Gooden, Jr.
(74) *Attorney, Agent, or Firm*—Mark S. Hubert

(57) ABSTRACT

A three wheeled vehicle that has an improved dual front wheel steering system that allows the vehicle to be maneuvered by a combination of arm and leg steering movements coupled with front end leaning that shifts the center of mass of the vehicle down and toward the inside wheel. This transfer of mass counteracts a conventional cornering vehicle's tendency to fling its mass to the outside wheel and lift the inner wheel off the ground as well as changing the angle of the line of force exerted through the tires, and enhancing the vehicles's grip on the ground. The vehicle has a reduced amount of sliding and potential of flipping when turning sharply. The steering system is compatible with traditional ACKERMAN steering geometry wherein the inner wheel turns in a smaller diameter circle than the outer wheel.

12 Claims, 8 Drawing Sheets

VEHICLE WITH IMPROVED STEERING SYSTEM

BACKGROUND OF THE INVENTION

The present invention relates to a vehicle with two front wheels that have an improved steering system. More particularly, to a dual front wheel steering system that turns or leans in unison or independently and can be steered with the arms, legs or both.

Prior art three wheeled vehicles exist with ACKERMAN steering geometry, but none that utilize matched upper and lower A frame tilt arms, configured so as to have neutral steering and to shift the vehicle's mass lower and toward the inner turning wheel when cornering. This is accomplished in part by aligning the main steering pivot point of the upper A frame tilt arm with the outer pivot points of the lower A frame tilt arm in a vehicle frame having a 7 degree positive castor angle.

The three wheeled vehicle's steering system fulfills a long felt need in the field of dual front wheel steering systems on three and four wheeled vehicles, powered or otherwise. This new invention utilizes and combines known and new technologies in a unique and novel configuration to overcome the prior art problems of vehicle rollover or skidding when making sharp or high speed turns.

SUMMARY OF THE INVENTION

The general purpose of the present invention, which will be described subsequently in greater detail, is to provide a method of two wheel front steering for three and four wheeled vehicles that is able to shift the mass of a turning vehicle lower (down) and closer to the inside turning wheel while still utilizing known steering technology that allows the inner wheel to turn sharper than the outer wheel to allow the inner wheel to travel in a smaller diameter circle than the outer wheel. This is a drastic departure from conventional steering geometry and has several advantages that are accented at higher speeds and as such is well suited for racing vehicles. Notably, when a racing vehicle goes into a corner the vehicle's mass is shifted to the outside wheel and the lightened inner wheel attempts to lift off of the ground. To compensate for this the race tracks are banked in the corners such that the outer wheel is at a higher elevation relative to the inner wheel.

With the present invention turning is much safer and can be accomplished at higher speeds. When the vehicle's mass is transferred down and inward upon cornering there are three main advantages. First, the inner wheel is less likely to lift off the ground and the vehicle is less likely to roll over away from the corner. Second, when in extremely sharp corners this shift of mass down and inward allows the line of force on the vehicle tires to be at a less acute angle with respect to the ground. This is especially attractive to vehicles such as motorbikes with thin wheels. When thin wheels corner their lean causes more of the tire sidewall to contacts the ground. Since the sidewall is not as good at holding the ground as the tread, scrubbing (sideways slipping or sliding) can occur in the corner. With the line of force less acute, more mass is placed on the treaded part of the wheel and the wheels "grip" is enhanced. This keeps the tire temperatures and the sidewall stresses lower. Third, the vehicle responds with a neutral handling condition in which during cornering the circular path of the vehicle's motion is of the same radius of the circle indicated by the direction its wheels are pointed (since there is no scrubbing).

It has many of the advantages mentioned heretofore and many novel features that result in a new invention which is not anticipated, rendered obvious, suggested, or even implied by any of the prior art, either alone or in any combination thereof.

In accordance with the invention, an object of the present invention is to provide an improved dual front wheel steering system that shifts the vehicle's mass inward and downward when cornering.

It is another object of this invention to provide an improved dual front wheel steering system capable of integration with existing steering systems having ACKERMAN steering geometry.

It is a further object of this invention to provide an improved three wheel vehicle that can be steered and leaned through a combination of shifting the driver's body position in relation to the vehicle through the exertion of force on the vehicle's handlebars and foot pegs.

It is still a further object of this invention to provide for an improved dual front wheel steering system that incorporates a matched set of upper and lower A arms, does not use a toe angle, utilizes ACKERMAN steering geometry, and has a positive castor angle.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
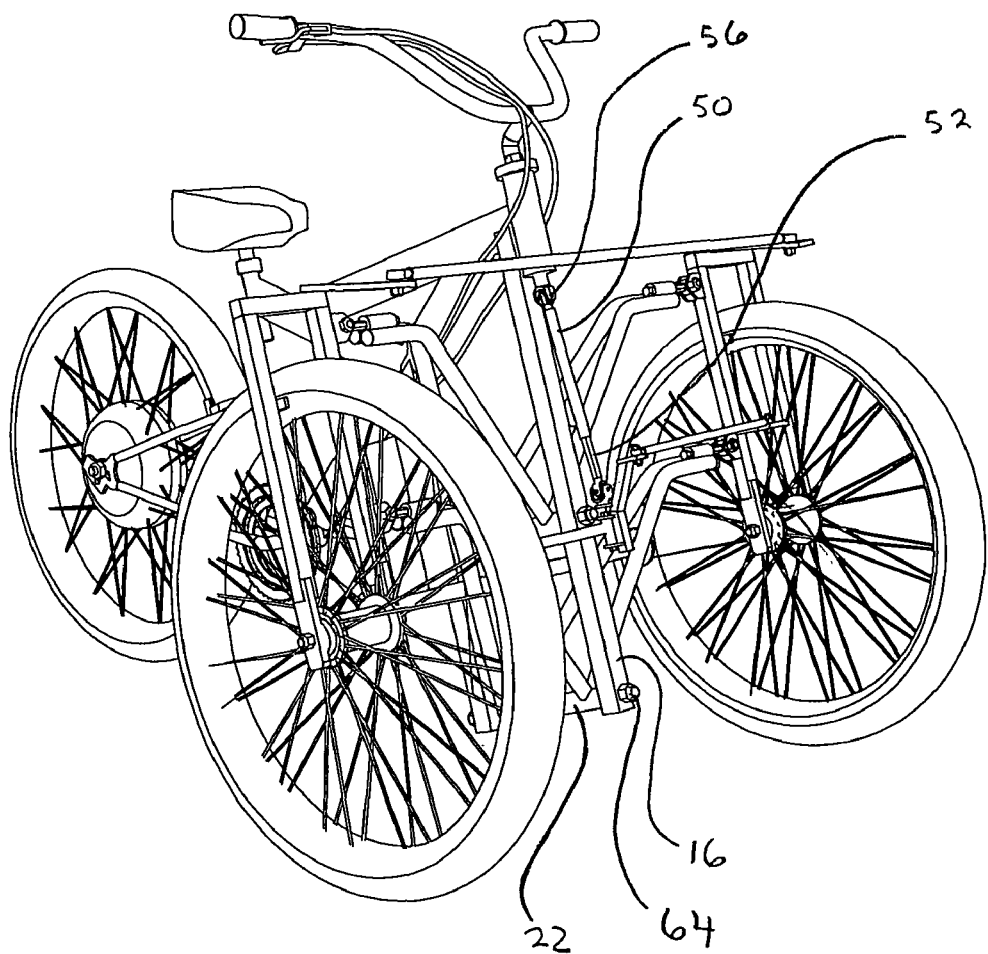
FIG. 1 is a perspective view of the vehicle with improved steering system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The steering system described herein is just as applicable for use on a four wheeled vehicle as on the three wheeled vehicle described herein. The three wheeled embodiment was chosen for purposes of clarity in the illustrations. The invention is capable of other embodiments and of being practiced and carried out in various ways. Also, it is to be understood that the phraseology and terminology employed herein are for the purpose of descriptions and should not be regarded as limiting.

This invention allows the center of gravity of a cornering vehicle to be transferred down (lower than in the straight ahead position) and toward the inside wheel, which is the opposite effect a conventional vehicle encounters when cornering. This prevents the inside wheel from lifting off the ground in extreme vehicular turning maneuvers, prevents wheel scrubbing, minimizes tire sidewall stress and heat buildup, and allows a neutral vehicle handling condition. All these attributes are extremely attractive features when racing.

The vehicle has both steering and leaning functions that will be discussed separately. These functions can be operated independently (I.E. one can lean the front wheels but not turn, turn but not lean the front wheels and turn and lean the front wheels simultaneously.) Operation in unison results in moving the vehicles mass downward and inward towards the inside wheel when cornering, and accomplishes the three effects discussed above.

Figure 3:
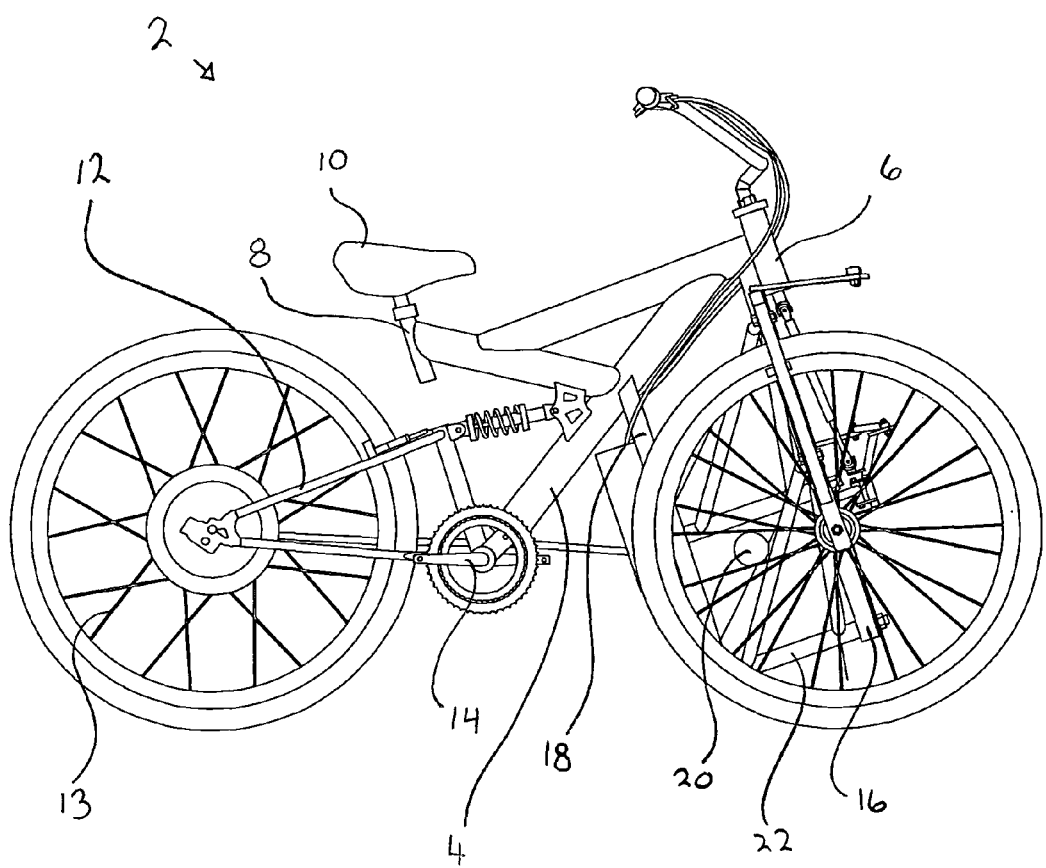
FIG. 3 is a side view of the vehicle with improved steering system.

Looking at FIG. 3 it can be seen that the trike 2 has a main frame 4 that conventionally supports a steering post 6, a seat post 8 and seat 10, a rear fork set (or swing arm) 12 and rear wheel and axle assembly 13 and an optional crank arm set 14. There is primary vertical stanchion 16 and a secondary vertical stanchion 18 that rigidly extend from the main frame 4 and are held in a parallel configuration by the upper and lower A frame tilt arms 60/58 and associated spacer 22. The dual front wheel steering system is mechanically connected to these stanchions. It is well known that there is a plethora of frames that the improved steering system could be adapted to.

The Steering Function

Figure 2:
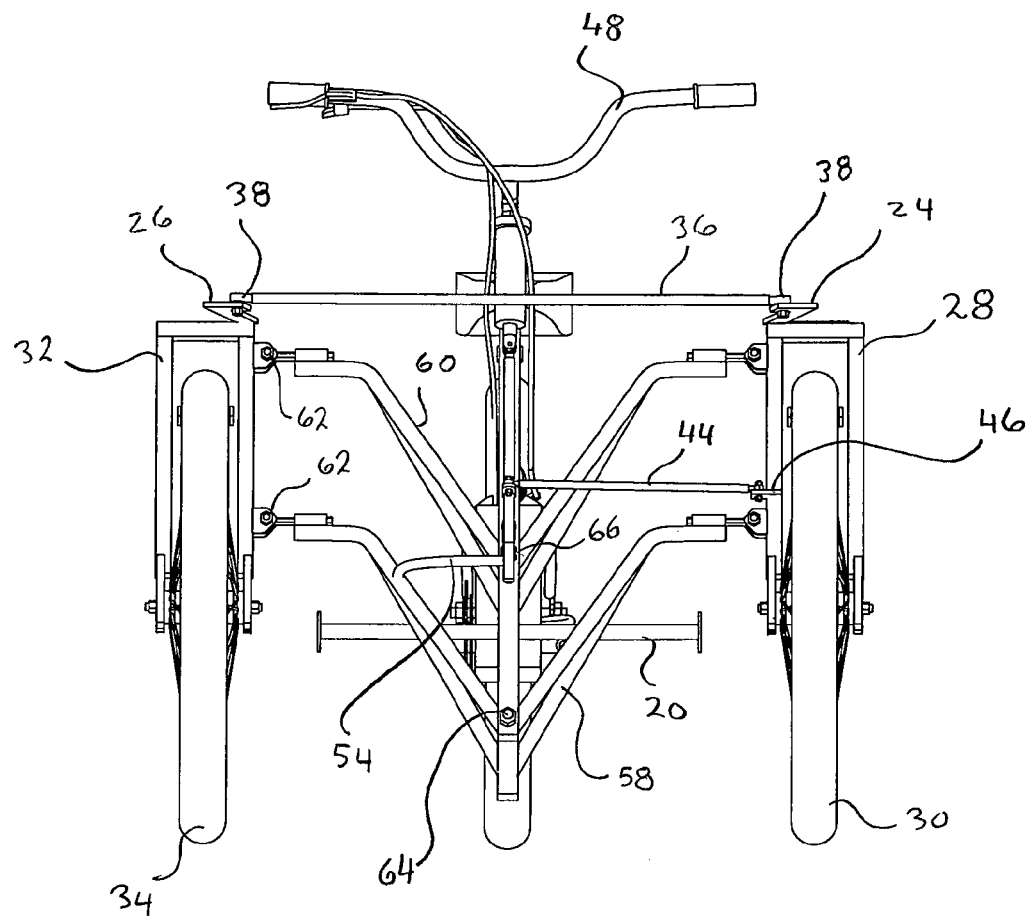
FIG. 2 is a front view of the vehicle with improved steering system.
Figure 4:
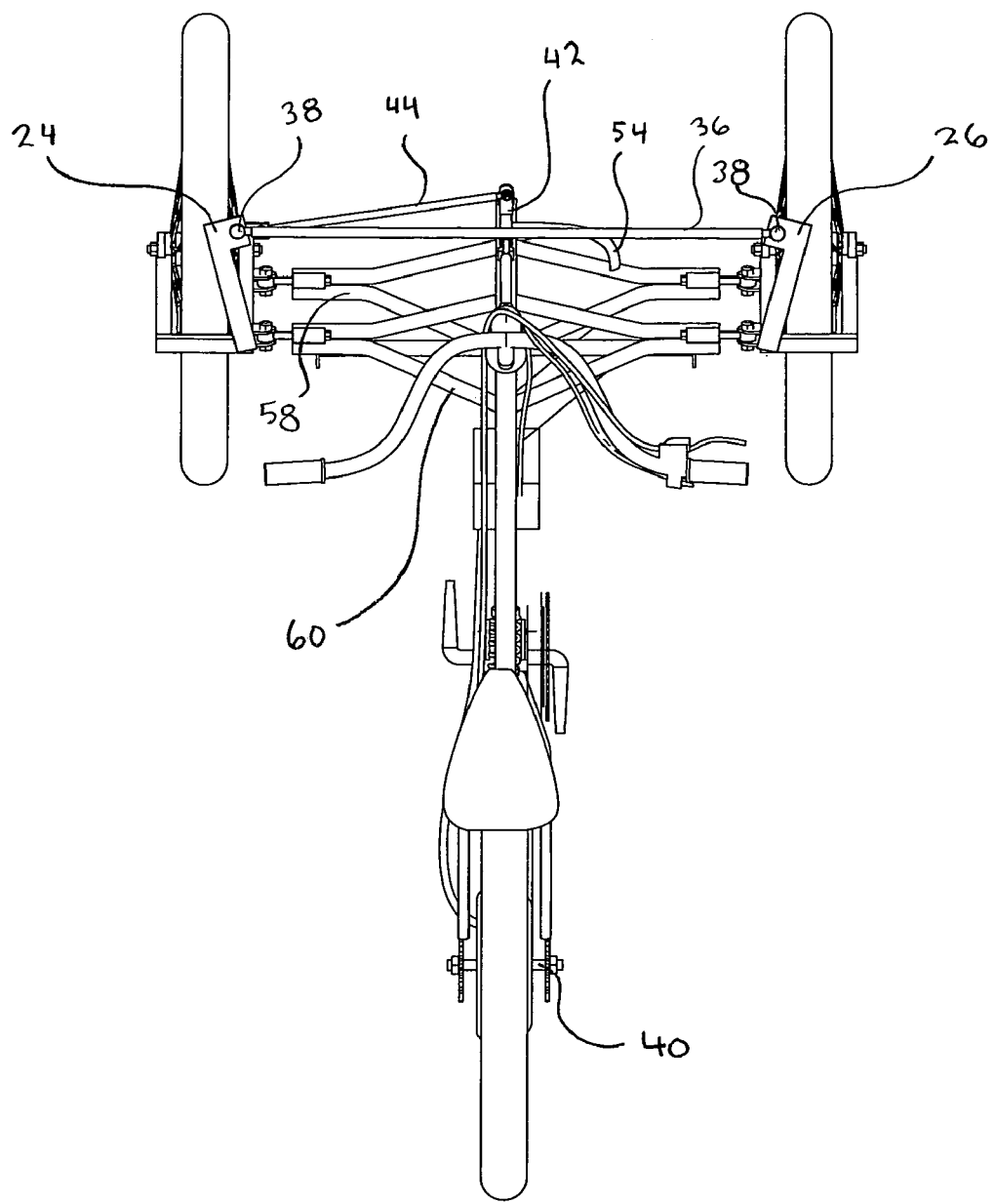
FIG. 4 is a top view of the vehicle with improved steering system.
Figure 8:
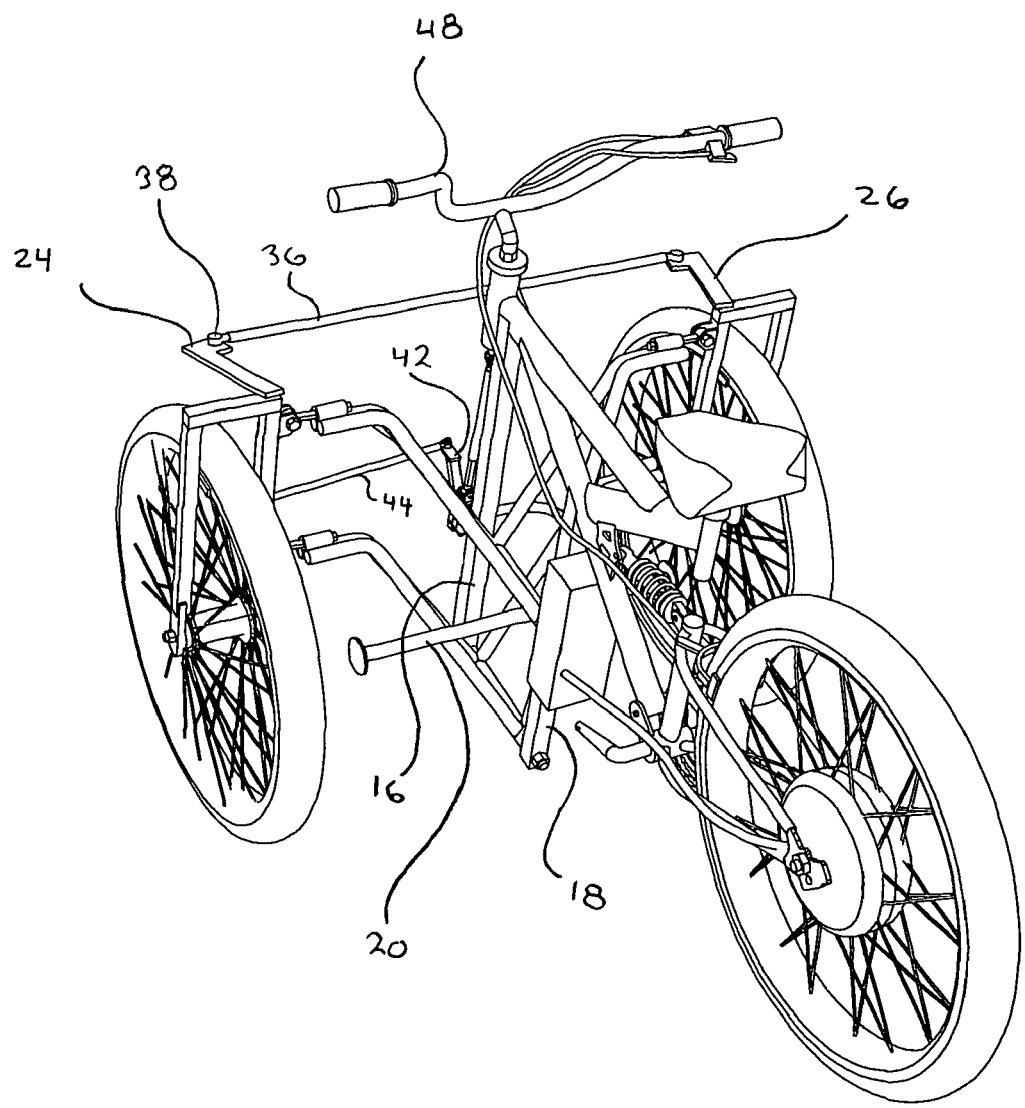
FIG. 8 is rear perspective view of the vehicle with improved steering system.

The steering components and their configuration on the present invention can best be seen looking at FIG. 1 (perspective view), FIG. 2 (front view), FIG. 4 (top view), and FIG. 8 (rear perspective view) together. There are a pair of mirror image secondary steering arms, one left secondary steering arm 24 and one right secondary steering arm 26. The inboard end of the left secondary steering arm 24 is rigidly connected to the top of the left front fork set 28 which rotationally house the left front wheel 30 directly beneath. Similarly, the inboard end of the right secondary steering arm 26 is rigidly connected to the top of the right front fork set 32 which rotationally house the right front wheel 34 directly beneath. Axles connected within each fork set that pass through an axle housing in each wheel allow the wheel/tire set to rotate, as is well known in the art. The outboard ends of the two secondary steering arms are pivotally connected to each other by a rigid tierod 36 coupled at each of its ends to the secondary steering arms by kingpins 38. These form the pivot points for the steering of the two front wheels. It is to be noted that the kingpins 38 allow biaxial pivoting to accommodate the turning and leaning of the steering system.

The secondary steering arms are not parallel to each other. The inboard ends of the secondary steering arms are closer together than the outboard ends. The geometry is such that two straight lines may be drawn from the two kingpins, through the linear axis of the secondary steering arms and to the center of the rear axle 40. With this arrangement, at any angle of steering, the center point of all of the circles traced by all wheels will lie at a common point. Thus when turning, the inside wheel turns sharper than the outside wheel. This solves the problem of wheels on the inside and outside of a turn tracing out circles of different radii. Since the steering arrangement is such that when turning, one kingpin 38 is under center and the other kingpin 38 is over center, the wheel on the side of the vehicle in the direction of the turn will turn sharper than the other wheel.

A primary steering arm 42 is pivotally connected at its distal end to a linkage arm 44 that is pivotally connected at its other end to an extension 46 rigidly connected to the left front fork set 28. Both these pivotal connections are of a configuration to allow biaxial pivoting to accommodate the turning and leaning of the steering system. The proximate end of the primary steering arm 42 is rigidly interconnected to the handlebars 48 as discussed below.

When the handlebars 48 are turned in a direction, the primary steering arm 42 pivots about its proximate end such that its distal end moves in the direction of the handlebar turn and exerts a steering force through the linkage arm 44 to the left front fork set 28 which simultaneously turns the left wheel 30 and transmits the corresponding force to the right front fork set 32 through the left secondary steering arm 24, the tierod 36 and the right secondary steering arm 26, therein turning the right front wheel 34.

Figure 7:
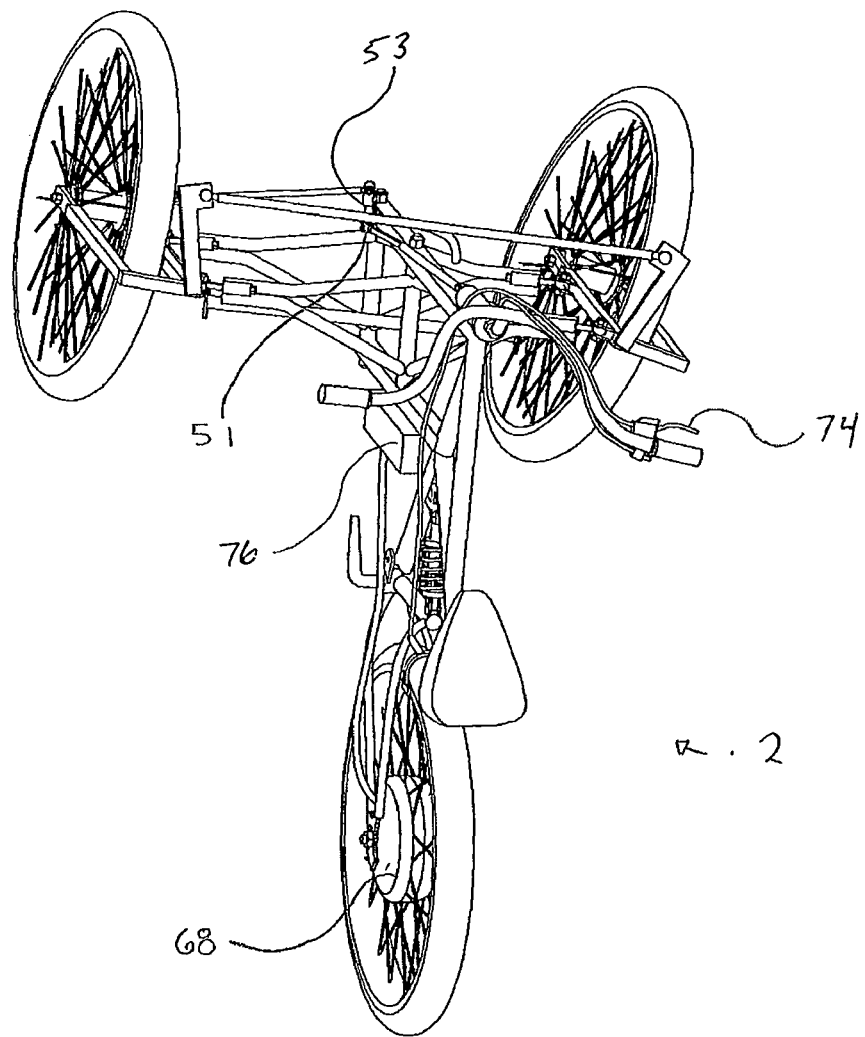
FIG. 7 is top view of the vehicle with improved steering system turning to the right.

The proximate end of the primary steering arm 42 is connected to an upper stub shaft 52 by a lower universal joint 51 (FIG. 7) and a lower stub shaft 53 that passes through and is rigidly affixed to the primary steering arm 42. The lower end of the lower stub shaft 53 is pivotally connected to a steering linkage support 54 that is rigidly affixed to a lower A arm. The upper stub shaft 52 has an externally splined surface that matingly engages a steering cylinder 50 that is internally splined at one end and has one half (Y yoke) of an upper universal joint 56 at the other end. This connects to an upper steering shaft that has a matingly conformed one half universal joint at one end and is rigidly connected to the handlebars 48 at the other end. The main body of the upper steering shaft is rotationally supported on a set of bearings that reside within the steering post 6. The upper stub shaft 52 and the steering cylinder 50 form a extendable steering shaft that is able to lengthen and shorten to accommodate the leaning of the trike. It is to be noted that the pivotal connections capable of biaxial pivoting (biaxial pivotal connectors) can be of several embodiments, however the pivotal connections used on the present invention are commonly known as ball joints wherein a ball stud is partially housed by a connectable body with a matingly conformed spherical inner surface. Other embodiments utilize a form of ball joint wherein a planar member having a concave aperture formed therein is matingly engaged around an external planar section of a spherical post.

Looking at FIG. 3 the 7 degree positive castor angle can be seen. That is to say that the angle of a line drawn through the longitudinal axis of either of the front forks would not extend through the point where the front wheel contacts the ground but rather would fall ahead of that. The angle that resides between this line and a vertical line would be approximately 7 degrees, which has experimentally been shown to give a good balance of self-centering for the steering. When the wheel trails behind the axis of steering the vehicle has better directional stability and a lessened tendency to wander, making the overall steering experience pleasant.

The Leaning Function

Looking collectively at FIGS. 1, 2, 4 and 8, the leaning function components can best be seen. A lower A frame tilt arm 58 and identical, parallel upper A frame tilt arm 60 are pivotally connected at their midpoints 64/66 to the primary vertical stanchion 16 and secondary vertical stanchion 18.

Each tilt arm has a front arm section and a rear arm section that merge together at outboard ends and increasingly diverge to a maximum distance by their midpoints where spacers reside. The outboard ends are connected to the inside of the front fork sets 28/32 with biaxial pivot connectors 62. It is of utmost importance that the midpoint pivotal connection of the upper A frame tilt arm and the primary vertical stanchion 16 lies along the horizontal line between the biaxial pivot connectors on the outboard ends of the lower A frame tilt arm 60. A foot steering shaft 20 is affixed about its midpoint to the upper spacer 22. Since the upper and lower A frame tilt arms are identical and parallel, the distance between the outboard ends of the upper and lower A frame tilt arms on the respective front fork sets and the distance between the midpoint pivotal connections of the upper and lower A frame tilt arms is identical. In this manner the longitudinal axis of the front fork sets remain parallel at all times.

In operation, to lean the front wheels the rider shifts his weight to one side of the vehicle by leaning at the waist causing the top end of the frame 4 to move away from the vehicle's centerline and toward the direction the rider is leaning in, or alternatively, the rider pushes their legs against the foot steering bar 20 forcing the bottom end of the frame 4 away from the centerline of the vehicle and away from the direction the rider wishes to lean the vehicle. In either of these maneuvers the lower A frame tilt arm's midpoint 64 and the upper A frame tilt arm's midpoint 66 remain the same distance apart, fixed on the primary vertical stanchion 16 and secondary vertical stanchion 18, although the stanchions now reside at an acute angle with respect to the vertical. It is important to note that the midpoint of the upper A frame tilt arm 66 remains in extremely close alignment with the lower A frame tilt arms outboard arms biaxial pivot connectors 62 within the given range of lean for the steering system.

Figure 5:
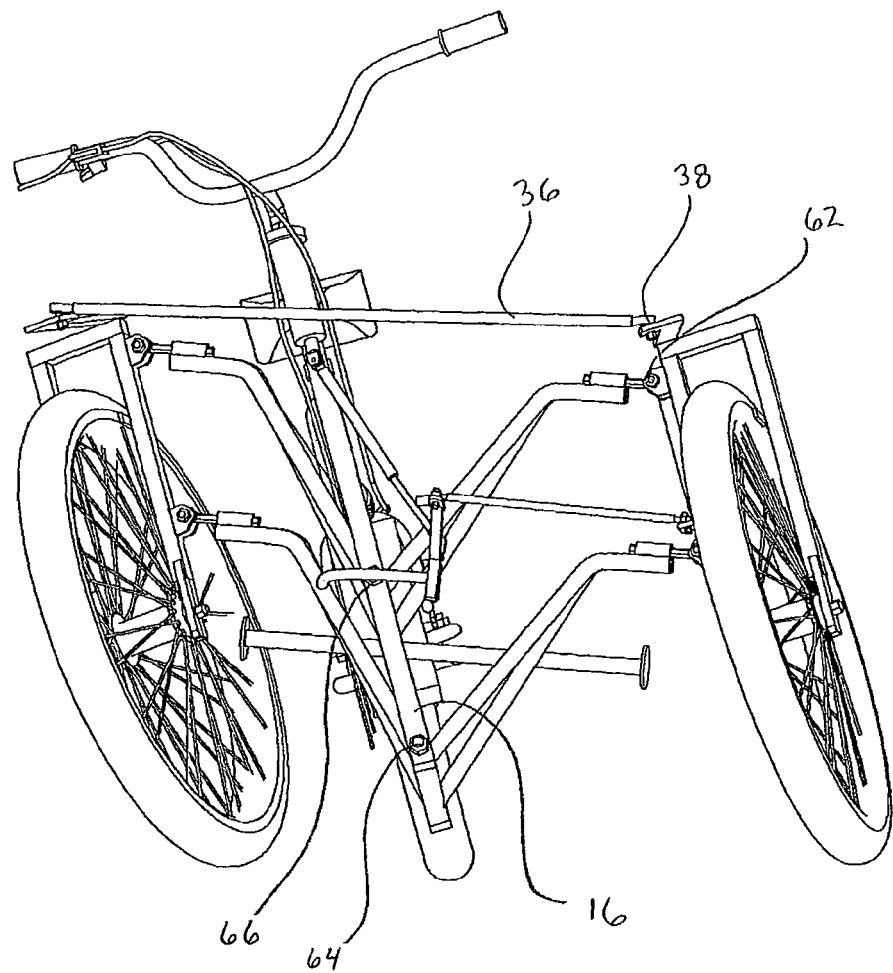
FIG. 5 is front view of the vehicle with improved steering system turning to the right.

As the primary stanchion 16 moves to the right (rider's perspective) as depicted in FIG. 5 the upper A frame tilt arm 60 pushes on the top end of the right front fork set 32 and pulls on the top end of the left front fork set 28 while the lower A frame tilt arm 58 pushes on the bottom end of the left front fork set 28 and pulls on the bottom end of the right front fork set 32. This causes both the right and left front fork sets to pivot about biaxial pivot connectors 62 and to lean at the same acute angle with respect to the vertical as the primary stanchion 16.

When the vehicle leans, the upper stub shaft 52 telescopically extends from the bottom of the steering cylinder 50 lengthening the assembly to compensate for the increase in distance between the steering post 6 and the primary steering arm 42. The use of lower universal joint 51 and upper universal joint 56 allow for the continued non binding rotation of the primary steering arm 42 by the handlebars 18. In this way the wheels ability to turn with the handlebars remains unaffected and independent of the leaning function.

When the vehicle leans, the tie rod 36 also tilts and would jam or deform at its outboard ends if kingpins 38 that did not allow pivotal motion in two axis were not used. The use of a biaxial rotational or pivot mechanism like the kingpins or a conventional ball joint allow the steering and leaning functions to function independently or simultaneously.

Figure 6:
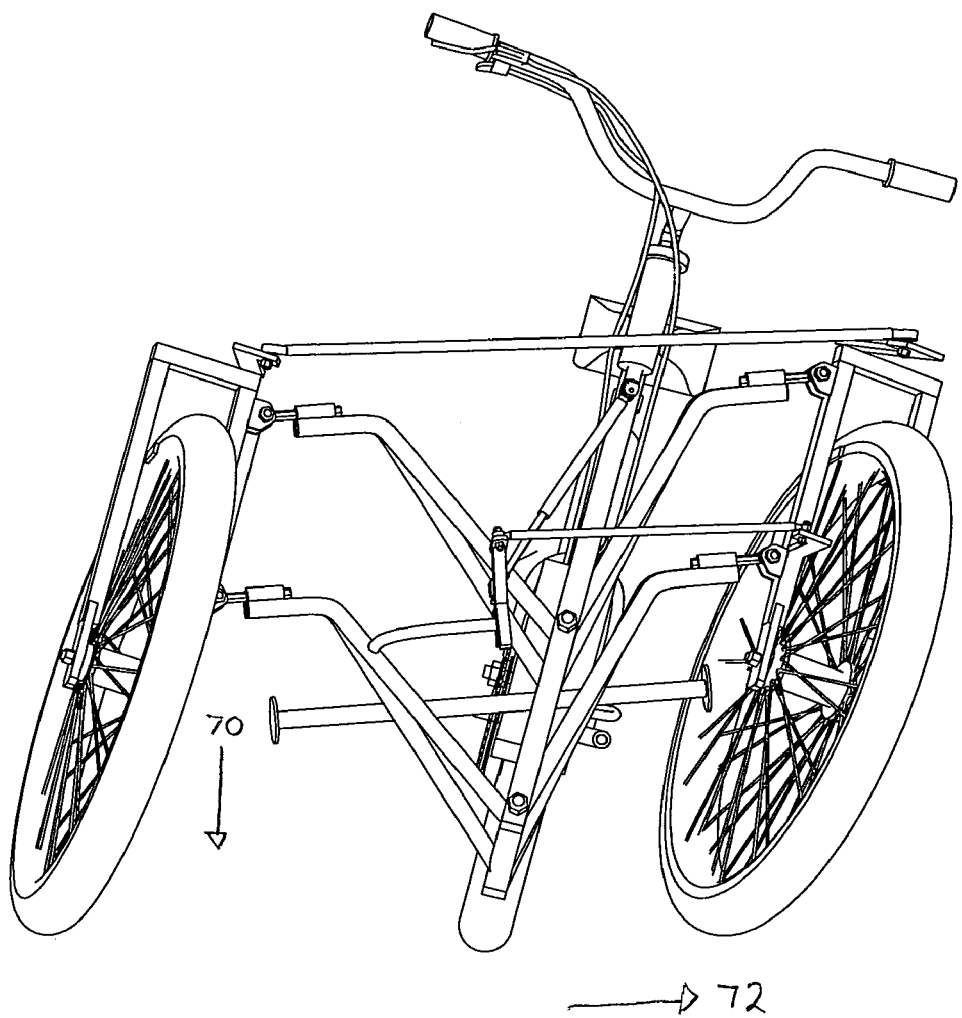
FIG. 6 is front view of the vehicle with improved steering system turning to the left.

Looking at FIG. 6 the combined leaning and steering functions will best be appreciated. It can be seen that the vehicle's mass moves downward as indicated by directional arrow 70 and inward as indicated by directional arrow 72. This feature helps maintain neutral steering, avoids wheel scrubbing on sharp turns, reduces tire sidewall stress and heat buildup, and minimizes the possibility of the inner wheel lifting off of the ground when cornering hard or at high speeds.

With the enhanced neutral steering of this system the trike wheels can lean without the trike turning to either side and will not steer to either side when going over a bump. The steering and leaning of the vehicles steering system as explained earlier, function independently however when combined drastically enhance the stability of the vehicle in hard or fast cornering.

The trike 2 of the present invention utilizes a motorized drive hub 68 powered by a centrally mounted power supply 76 that controls the vehicle's speed through a control lever 74. (Ref FIG. 7) This type of drive configuration is well known in the field.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A dual front wheel steering system adapted for operation with a three or four wheeled vehicle comprising:
   a primary stanchion extending substantially vertically from a vehicle frame;
   a parallel secondary stanchion extending substantially vertically from said vehicle frame;
   two front wheels rotationally mounted on axles;
   two axle supporting members housing said axles;
   two secondary steering arms, each rigidly mounted onto a different said axle supporting member;
   two first spherical posts, one each extending vertically therefrom said secondary steering arms;
   a linear member having a first end and a second end each with a first biaxial pivot member affixed thereon and matingly engaged with said first spherical posts;
   a manual steering device;
   a rotatable, telescopic steering column having a upper end and a lower end,
   an upper steering column support on said frame and rotationally housing an upper section of said steering column;
   a lower steering column support rotationally housing a lower section of said steering column;
   a main steering arm affixed to said steering column adjacent said steering column lower end;
   an extension plate projecting normally from one of said axle supporting members;
   two second spherical posts, one extending vertically therefrom said main steering arm and one extending vertically therefrom said extension plate;
   a steering linkage rod having a first end and a second end each with a second biaxial pivot member affixed thereon and matingly engaged with said second spherical posts;
   an upper A frame tilt arm having two outboard ends each one connected to biaxially pivot with an axle supporting member, and a first midpoint spacer tube pivotally connected between said primary and secondary stanchions;
   a lower A frame tilt arm having two outboard ends each one connected to biaxially pivot with an axle supporting member, and a second midpoint spacer tube pivotally connected between said primary and secondary stanchions and wherein said lower steering column support is rigidly affixed to said lower A frame tilt arm; and a foot steering bar rigidly mounted to and perpendicular to said primary stanchion;

wherein said steering column upper end is rigidly affixed to said steering device and said steering column lower end is connected to said main steering arm, and wherein said first spacer tube's pivotal connection to said stanchions reside in a common plane with the biaxial pivotal connections on the outboard ends of said lower A frame tilt arm.

2. The dual front wheel vehicular steering system of claim 1 wherein said axle supporting members are fork sets.

3. The dual front wheel vehicular steering system of claim 2 wherein said linear member is a tie rod.

4. The dual front wheel vehicular steering system of claim 3 wherein said biaxial pivot is a kingpin.

5. The dual front wheel vehicular steering system of claim 4 wherein said secondary steering arms have a proximate end affixed to said axle supporting member, and a distal end from which said spherical posts extend normally therefrom, and wherein each said secondary steering arm has a linear axis that extends through the center of a rear wheel axle.

6. The dual front wheel vehicular steering system of claim 1 wherein said manual steering device is a set of handlebars.

7. The dual front wheel vehicular steering system of claim 6 wherein said manual steering device is a set of handlebars.

8. The dual front wheel vehicular steering system of claim 7 wherein a third spherical post extends from the outboard ends of said lower and upper A frame tilt arms that is matingly engaged with one of a set of third biaxial pivot members extending from said axle supporting members.

9. A dual front wheel steering system adapted for operation with a three or four wheeled vehicle comprising:

a first stanchion extending substantially vertically from a vehicle frame;

a second stanchion extending substantially vertically from said vehicle frame and residing parallel to said first stanchion;

a right front wheel rotationally mounted on a right axle;

a left front wheel rotationally mounted on a left axle;

a right axle supporting member housing said right axle;

a left axle supporting member housing said left axle;

a left secondary steering arm, rigidly mounted to said left axle supporting member;

a right secondary steering arm, rigidly mounted to said right axle supporting member;

a linear member having a first end pivotally connected to said left secondary steering arm and a second end pivotally connected to said right secondary steering arm;

a handlebar steering device;

a rotatable, telescopic steering column having a upper end connected to said handlebar steering device and a lower end, an upper steering column support formed in said frame and rotationally housing an upper section of said steering column;

a lower steering column support rotationally housing a lower section of said steering column;

a main steering arm affixed to said steering column between said upper and said lower steering column supports;

a steering linkage rod having a first end pivotally connected to said right axle supporting member and a second end pivotally connected to said main steering arm;

an upper A frame tilt arm having a first and second outboard end said first end connected to said right axle supporting member by a biaxial rotational connector and said second outboard end connected to said left axle supporting member by said biaxial rotational connector, and a first midpoint spacer tube pivotally connected between said first and second stanchions;

a lower A frame tilt arm having a first and second outboard end said first end connected to said right axle supporting member by said biaxial rotational connector and said second outboard end connected to said left axle supporting member by said biaxial rotational connector, and a first midpoint spacer tube pivotally connected between said first and second stanchions, and wherein said lower steering column support is rigidly affixed to said lower A frame tilt arm; and a foot steering bar rigidly mounted to and perpendicular to said first stanchion;

wherein said first spacer tube's pivotal connections to said first stanchion and said second stanchion reside in a common plane with the biaxial rotational connectors on the outboard ends of said lower A frame tilt arm.

10. The dual front wheel vehicular steering system of claim 9 wherein said biaxial rotational connectors are comprised of a planar member having a concave aperture formed therein that is matingly engaged around an external planar section of a spherical post.

11. The dual front wheel vehicular steering system of claim 9 wherein said biaxial rotational connectors are comprised of a mechanically connectable member having a spherical aperture formed therein that is matingly engaged around part of an external section of a spherical post.

12. The dual front wheel vehicular steering system of claim 11 wherein said all said pivotal connections are made with biaxial rotational connectors.

* * * * *